United States Patent [19]

Picquendar et al.

[11] 4,092,723
[45] May 30, 1978

[54] COMPUTER FOR COMPUTING A DISCRETE FOURIER TRANSFORM

[75] Inventors: Jean-Edgar Picquendar; Boris Sokoloff, both of Paris, France

[73] Assignee: Thomson-CSF, Paris, France

[21] Appl. No.: 728,505

[22] Filed: Oct. 1, 1976

[30] Foreign Application Priority Data

Oct. 2, 1975 France .................. 75 30235

[51] Int. Cl.² ........................................ G06F 15/34
[52] U.S. Cl. ........................................ 364/726
[58] Field of Search .............. 235/156, 152, 164; 324/77 B, 77 D; 364/72 G

[56] References Cited

U.S. PATENT DOCUMENTS

| | | | |
|---|---|---|---|
| 3,662,161 | 5/1972 | Bergland | 235/152 |
| 3,702,393 | 11/1972 | Fuss | 235/156 |
| 3,875,391 | 4/1975 | Shapiro et al. | 235/156 |

OTHER PUBLICATIONS

M. C. Pease, "Organization of Large Scale Fourier Processors," J. of Assoc. for Computing Machinery, vol. 16, No. 3, Jul. 1969, pp. 474–482.

*Primary Examiner*—David H. Malzahn
*Attorney, Agent, or Firm*—Cushman, Darby & Cushman

[57] ABSTRACT

The invention relates to machines by which it is possible to compute the discrete Fourier transform of a collection of N numbers in the case where $N = 2^n$. The invention consists in using the properties of Pease's decomposition, according to which $$[w]' = \prod_{m=1}^{n} (C \times E_m \times P),$$

and in constructing a computer comprising $n$ identical modules except for the coefficients memorized therein, these modules each effecting the application of a term $C \times E_m \times P$.

6 Claims, 6 Drawing Figures

COMPUTER FOR COMPUTING A DISCRETE FOURIER TRANSFORM

This invention relates to computers for computing a discrete Fourier transform by which it is possible to obtain by digital techniques a signal representing the Fourier transform of another signal which itself represents a physical quantity on the values of which it is desired to effect this transformation.

It is often necessary, in particular for problems of correlation or convolution, to effect a Fourier transform on electrical signals. For this purpose, these signals have to be sampled and digitalized. A discrete rather than continuous Fourier transform is obtained in this way. To obtain this transform, the product of a square matrix termed [w] of order N×N, representing the transformation, has to be formed by a column vector with N components, which means that $N^2$ complex products have to be formed.

In an Article entitled "An algorithm for the machine computation of complex Fourier series" published in the Journal Math. Comput No. 19,90 of April 1965, Cooley and Tukey showed that, by decomposing this matrix in an adequate form, it was possible to considerably reduce the number and length of the calculations. This method is known by the name of "Fast Fourier Transform". However, the form thus obtained does not lend itself to the design of an interesting wired machine capable of carrying out the calculations based on that decomposition, and conventional embodiments have essentially consisted in making the computations by means of an ordinary digital computer using a program written from Cooley and Tukey's algorithm.

In an Article entitled "An adaptation of the Fast Fourier Transform for parallel processing" published in the "Journal of the Association for Computing Machinery", Vol. 15, No. 2 of April 1968, Pease showed that it was possible further to increase Tukey and Cooley's decomposition so as to bring the matrix [w] into the form of a product.

In accordance with the present invention, an apparatus is disclosed for performing upon an incoming digital signal comprising $N = 2^n$ elementary incoming digital signals represented by a vector $\vec{f}$, a discrete Fourier transform represented by a matrix [w], delivering an output digital signal corresponding N elementary output digital signals represented by a vector $\vec{g} = 1/N [w] \vec{f}$, and said matrix being able to be decomposed in accordance with the equation [w]=

$$Q \begin{bmatrix} n \\ \pi \\ m = 1 \end{bmatrix} (C \times E_m \times P),$$

said apparatus comprising an succession of n modules connected in series, each of said modules corresponding to the calculation of one term $C \times E_M \times Q$, the first of said modules receiving said signal $\vec{f}$, the last of said modules delivering a non-standardized signal represented by a vector $$\begin{bmatrix} n \\ \pi \\ m = 1 \end{bmatrix} (C \times E_m \times P) \vec{f}$$

and a module $k$ comprising:

memory means for receiving from the preceding module k-1 a succession of N intermediate incoming signals, delivering said intermediate incoming signals in pairs in accordance with an order defined by the matrix P; and calculating means receiving said intermediate incoming signals from said memory means for performing the calculation corresponding to the matrix product $C \times E_k$, delivering to the next module $k+1$ a succession of N next intermediate incoming signals.

For a better understanding of the invention, and to show how the same may be carried into effect, reference will be made to the ensuing description and to the attached figures among which.

Given N equidistant samples $f_s (o < s < N-1)$ of a function $f(t)$, the N coefficients $g_r$ of the Fourier transform of that function are thus defined:

$$g_r = \frac{1}{N} \sum_{s=0}^{N-1} (\exp. 2\pi j\, rs/N) f_s; j = \sqrt{-1}$$

If these N coefficients and the N samples are expressed in the form of two column vectors $$\vec{f} = \text{col } (f_0, f_1, \ldots f_{N-1})$$

$$\vec{g} = \text{col } (g_0, g_1, \ldots g_{N-1})$$

it is possible to define a matrix [w] of which the coefficients are $(W)_{rs} = W^{rs} = \exp 2\pi j\, rs/N$ and the above equation will be written in matrix form as follows:

$$\vec{g} = \frac{1}{N} [w] \vec{f}$$

In order to simplify the notations, the matrix [w] will be written in a classic conventional form, retaining only the variable term $r \times s$ of the exponential. This matrix will thus be presented in the following form:

$$[w] = \begin{bmatrix} 0 & 0 & 0 & \ldots & 0 \\ 0 & 1 & 2 & \ldots & (N-1) \\ 0 & 2 & 4 & \ldots & 2(N-1) \\ 0 & 3 & 6 & \ldots & 3(N-1) \\ \vdots & & & & \\ 0(N-1) & 2(N-1) & \ldots & (N-1)(N-1) \end{bmatrix}$$

In the complete numerical expression of such a matrix, the writing may be even further simplified by pointing out that the coefficients $(w)_{rs}$ are equal for all the values of $r \times x$ modulo N and that, therefore, all the terms $r \times s$ may be brought to their modulo N value comprised between 0 and N−1.

Pease showed that, when N was equal to a whole power of 2, i.e., $N = 2^n$, this matrix could be put into the following form:

$$[w] = Q[w]' = Q\left[\prod_{m=1}^{n}(C \times E_m \times P)\right]$$

The matrix Q is a permutation matrix which, when the computations of the term between brackets are determinated, replaces the various lines of the matrix $[w]'$ in the natural order of the indices $r$. It may be defined in the following manner: the lines of $[w]'$ are numbered in binary form in downwardly increasing order, after which the order of the digits in the binary numbers is reversed and the lines of the matrix are rearranged so that the binary numbers numbering the lines are again in downwardly increasing order. For example, where $N = 4$:

$$[w] = \begin{bmatrix} 0\,0\,0\,0 \\ 0\,1\,2\,3 \\ \vdots \\ 0\,2\,0\,2 \\ 0\,3\,2\,1 \end{bmatrix} \begin{matrix} 00\,00 \to \\ 01\,10 \\ \\ 10\,01 \\ 11\,11 \to \end{matrix} \begin{bmatrix} 0\,0\,0\,0 \\ 0\,2\,0\,2 \\ \vdots \\ 0\,1\,2\,3 \\ 0\,3\,2\,1 \end{bmatrix} = [w]'$$

line numbers ⟵ ⟶ reversed number

The matrix P is a mixing matrix which is defined by the following correspondence between two column vectors of which the coefficients are $x_s$:

$$n - P \times \mathrm{col}(x_0, x_1, \ldots, x_{\frac{N}{2}-1}, x_{\frac{N}{2}}, \ldots, x_{N1}) =$$

$$\mathrm{col}(x_0, x_{\frac{N}{2}}, x_1, x_{\frac{N}{2}+1}, \ldots, x_{\frac{N}{2}-1}, x_{N-1})$$

When $N = 8$, for example, this matrix is in the following form in which the terms are the effective coefficients and not the variable terms of the exponential:

$$P = \begin{bmatrix} 1\,0\,0\,0\,0\,0\,0\,0 \\ 0\,0\,0\,0\,1\,0\,0\,0 \\ 0\,1\,0\,0\,0\,0\,0\,0 \\ 0\,0\,0\,0\,0\,1\,0\,0 \\ 0\,0\,1\,0\,0\,0\,0\,0 \\ 0\,0\,0\,0\,0\,0\,1\,0 \\ 0\,0\,0\,1\,0\,0\,0\,0 \\ 0\,0\,0\,0\,0\,0\,0\,1 \end{bmatrix}$$

The matrices $E_m$ are diagonal matrices defined as the product of the diagonal matrices $F_2^i$ in accordance with the rule:

$$E_1 = F_2^{n-2} \times F_2^{n-3} \ldots F_2^1 \times F_2^0$$

$$E_2 = F_2^{n-2} \times F_2^{n-3} \ldots F_2^1$$

$$E_{n-1} = F_2^{n-2}$$

$$E_n = I$$

The formation rule of the matrices $F_2 i$ is as follows: the positions are numbered from 0 to $N-1$ along the diagonal after which these numbers are expressed in pure binary form. In the case of the matrix $F_2 i$, the values of the coefficients of the diagonal are $2^i$ for the positions in which the $(i+1)^{th}$ and the last bit of the number, starting from the left, are equal to 1. All the other coefficients are zero.

For example, where $N = 16$, for $F_4 = F_2^2$

```
 0  0 0 0 0
 1  0 0 0 1
 2  0 0 1 0
 3  0 0 1 1 ⟶ r × s = 4
 4  0 1 0 0
 5  0 1 0 1
 6  0 1 1 0
 7  0 1 1 1 ⟶ r × s = 4
 8  1 0 0 0
 9  1 0 0 1
10  1 0 1 0
11  1 0 1 1 ⟶ r × s = 4
12  1 1 0 0
13  1 1 0 1
14  1 1 1 0
15  1 1 1 1 ⟶ r × s = 4
```

$2 + 1 = $ 3rd bit ⟵ ⟶ last bit
$F_4 = \mathrm{diag}(0\,0\,0\,4\,0\,0\,0\,4\,0\,0\,0\,4\,0\,0\,0\,4)$ The matrix C is defined as being Kronecker's product of the unit matrix of order N/2 by the matrix $$T_2 = \begin{bmatrix} 1 & 1 \\ 1 & -1 \end{bmatrix}$$

in which the terms are the effective coefficients and not the variable terms of the exponential: $C = T_2 \times I_{N/2}$
Where $N = 16$ for example:

$$C = \begin{bmatrix} 1 & 1 & 0\,0 & 0\,0 & 0 \\ 1 & -1 & 0\,0 & 0\,0 & 0 \\ 0 & 0 & 1\,1 & 0\,0 & 0 \\ 0 & 0 & 1\,-1 & 0\,0 & 0 \\ 0 & 0 & 0\,0 & 1\,-1 & 0 \\ 0 & 0 & 0\,0 & 0\,1 & 1 \\ 0 & 0 & 0\,0 & 0\,1 & -1 \end{bmatrix} \quad 0$$

Figure 1:
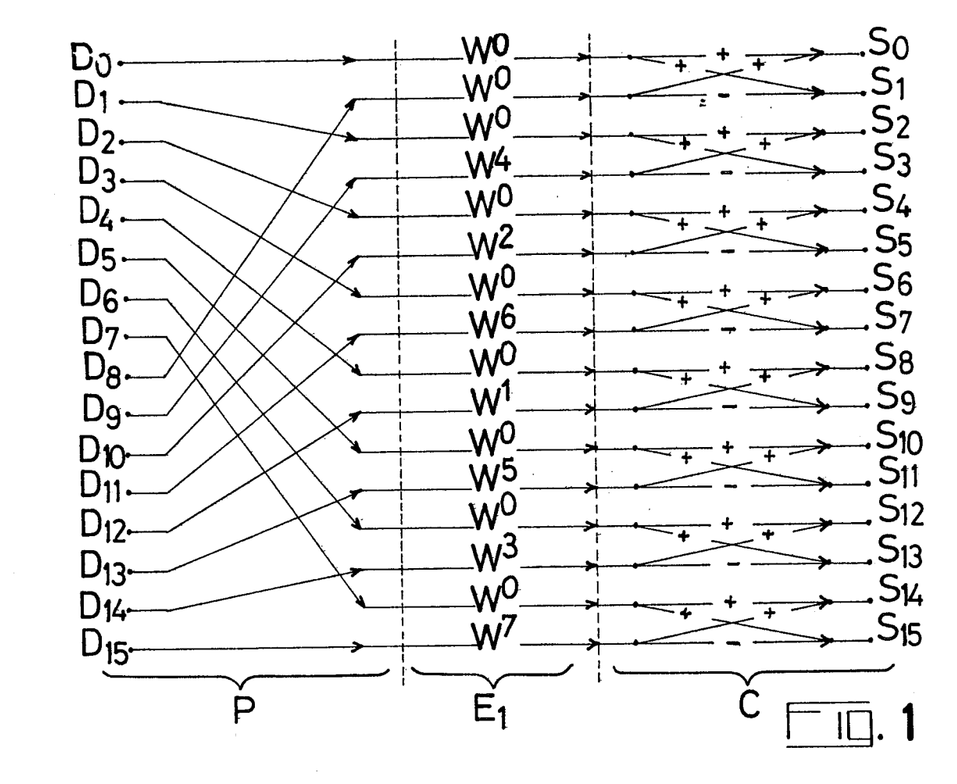
FIG. 1 illustrates graphically a matrix product according to Pease's decomposition.

It is interesting graphically to illustrate the sequence of operations expressed by one of the terms of the product $\pi$. FIG. 1 shows one such graph for the term $C \times E_4 \times P$ in the case where $N = 16$, which thus corresponds to a matrix $E_1 \times \mathrm{diag}(0\,0\,0\,4\,0\,2\,0\,6\,0\,1\,0\,5\,0\,3\,0\,7)$.

The 16 numbers $D_0$ to $D_{15}$ to which the product $C \times E_4 \times P$ is to be applied (in the mathematical sense) are on the left of the figure. They successively undergo application of the matrices P, $E_1$ and C, this order conforming to matrix writing. These three applications are represented by the three sections P, $E_1$ and C of the graph comprised between the dotted vertical lines. These sections are themselves located from left to right in accordance with the standard writing order. The arrows indicate the displacement of the numbers in the section traversed, while the symbols associated with these arrows indicate the operations effected on the numbers thus displaced, $W^i$ representing a multiplication by the coefficient $W^i$, $+$ an addition and $-$ a subtraction. The result of these three successive applications is composed of 16 numbers $S_0$ to $S_{15}$.

The section P corresponds to the application of the mixing matrix P. As can be seen, the numbers are merely rearranged in the order indicated, hence the name mixing.

The section $E_1$ corresponds to the application of the matrix $E_1$. Since this matrix is diagonal, the terms are not combined with one another, instead each term is just multiplied by a power of W. By examining the formation rules of the matrices $F_1$ and hence of the matrices E, it can be seen that at least one of two of the exponents of W is equal to zero because, in pure binary form, the last bit on the right of the number of the exponent is equal to zero on one occasion out of two (for the even numbers). Since $W^0 = 1$, at least one of two of the multiplications will not have to be made.

The section C corresponds to the application of the matrix C. There is no multiplication, but instead a combination of additions and subtractions of the terms taken two by two.

It can be seen in the expression of the matrix $$[w]' = \prod_{m=1}^{n} (C \times E_m \times P)$$

that the terms of this product differ from one another only in the values of the coefficients of the matrix $E_m$ which are not always zero. It is therefore interesting to construct a modular apparatus which carries out all the operations represented by $[w]'$ and which is made up of a series of similar modules each effecting the operations represented by one of the terms $C \times E_M \times P$. These modules will be identical except for the circuits which may be obtained on completion of manufacturing by a simple operation from a structure common to all of them.

Figure 2:
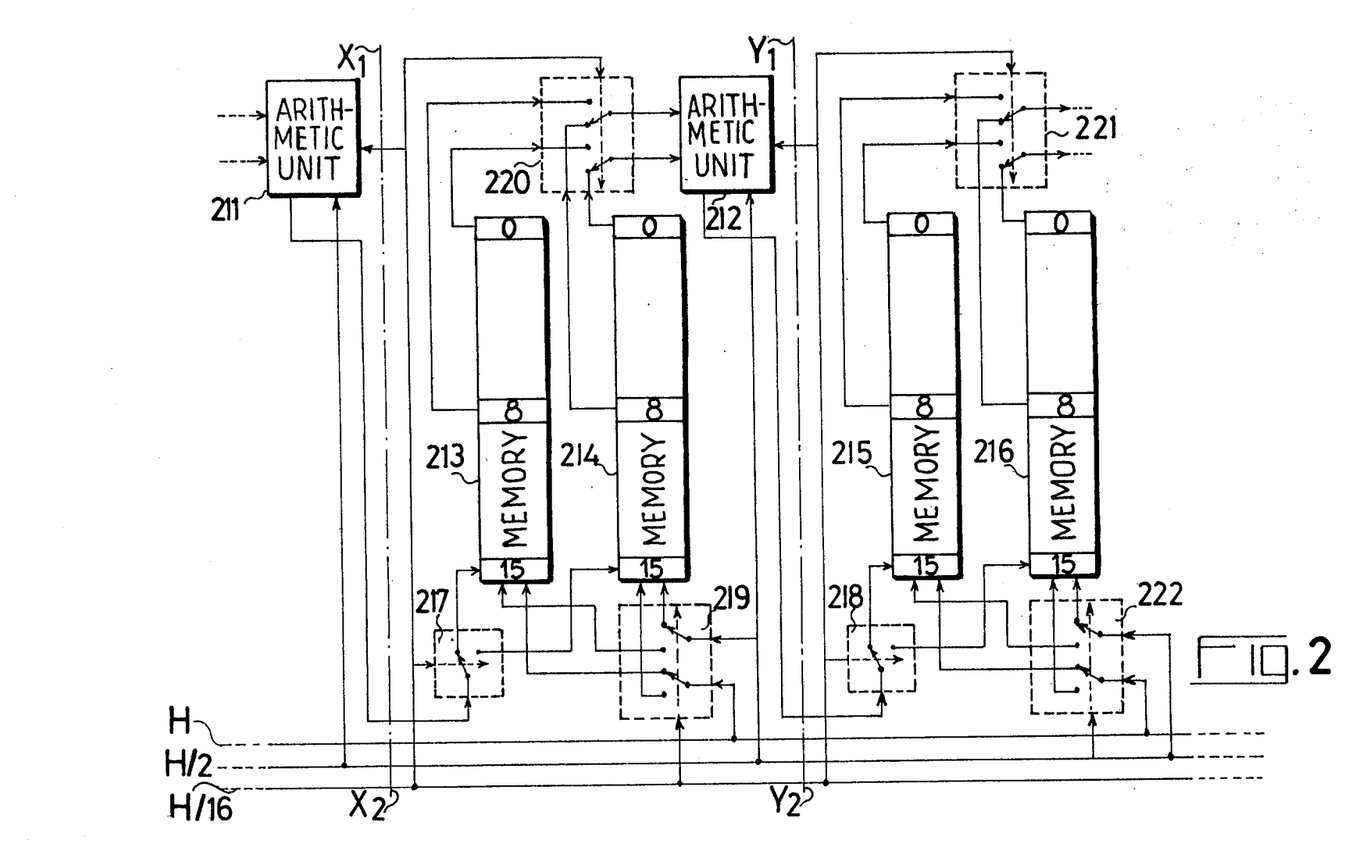
FIG. 2 illustrates a block diagram of a module of a computer according to the invention.

FIG. 2 represents one such module together with part of the preceding module and part of the following module for N=16. The complete module shown in comprised between the axes $X_1X_2$ and $Y_1Y_2$. The embodiment illustrated comprises two arithmetic units 211 and 212, four memories 213 to 216, two single commutators 217 and 218 and four double commutators 219 to 222. The arrows on the moving armatures of these commutators indicate, in accordance with a standard convention, the sides of the moving contacts which are switched and bear no relation to the direction of the signals in these commutators. In accordance with a drawing convention, which is also adopted for the following figures, the arrowed connections equally represent the path followed either by single signals or by words made up of several bits in series or in parallel, the difference being made by the text of the description. In particular, for those operations which relate to complex numbers, the real and imaginary parts are dealt with separately. The modules receive clock signals H, H/2 and H/16. H/2 has a frequency half that of H while H/16 has a frequency 1/16 that of H. These signals are in phase and the delays necessary for the completion of the operations in the order described, the particular for the following mathematical operations, are incorporated in the computing and memorizing elements which receive them. This convention also applies to the following figures.

We shall now describe the operations corresponding to the application of the term $C \times E_3 \times P$ in the complete module illustrated, the latter comprising the adequate values of the coefficients of $E_3$. This application is illustrated by FIG. 1 except for the value of said coefficients. This application lasts a time T corresponding to 16 times $T_O$ to $T_{15}$ marked by the clock signals H. For this application, the commutators 217 to 222 are placed in the direction shown in FIG. 2.

The numbers $D_O$ to $D_{15}$ have been positioned in a manner which will be described hereinafter in the sixteen words of corresponding number of the memory 214. The three calls 0, 8, 15 corresponding to three of these words have been shown in FIG. 2. The memory 214 receives the clock signal H/2 via the commutator 219. The numbers stored therein are transferred from one cell to the following cell at the frequency of this signal H/2 in the ascending direction in the figure. Thus, at the beginning of the time $T_O$, the cells 0, 8, 15 contain the numbers $D_O$, $D_8$, $D_{15}$, while at the beginning of the time $T_2$ the cells 0 and 8 contain the numbers $D_1$ and $D_9$ and the cell 15 is empty. At the beginning of the time $T_{14}$, the cells 0 and 8 thus contain the numbers $D_7$ and $D_{15}$.

The words 0 and 8 of this memory are read at the beginning of each even time defined by the signal H/2 and are transferred via the commutator 220 to the arithmetic unit 212. Referring to FIG. 1, it can be seen that this reading operation corresponds to the application of the mixing matrix P because $D_0$ and $D_8$, $D_1$ and $D_9$, etc. and finally $D_7$ and $D_{15}$ are successively obtained i.e., in pairs in the order in which they are arranged on the straight line of the section P in FIG. 1.

The arithmetic unit 212 enables the pairs of numbers $(S_O, S_1), (S_2,S_3), \ldots, (S_{14}, S_{15})$ to be obtained from the pairs of numbers $(D_0, D_8), (D_1, D_9), \ldots, (D_7, D_{15})$. It operates at the frequency of the signal H/2 because the pairs of numbers $D_j$ arrive at that frequency. The case of the pair $(D_1, D_9)$ for example will now be considered. $D_1$ is taken as such because it is multiplied by $W^0 = 1$ which is always the case with the first number of the pair. $D_9$ is multiplied by $W^4$. The unit 212 then makes the addition $D_1(D_9 \times W^4)$ which gives $S_2$ and the subtraction $D_1(D_9 \times W^4)$ which gives $S_3$.

These numbers $S_2$ and $S_3$ are successively available at the times $T_2$ and $T_3$ at the output of the arithmetic unit 212 and are directed towards the memory 215 via the commutator 218.

The memory 215 is identical with the memory 214 as are all the other memories of the apparatus, in particular the memories 213 and 216.

The numbers $S_1$ coming from the commutator 218 are stored in the cell 15 of the memory 215 at the frequency of the time $T_i$. This memory receives the clock signal H via the commutator 222. The numbers stored therein are transferred from one cell to the following cell in the ascending direction in the figure at the frequency of the signal H. Thus, at the end of the time $T_0$, the number $S_O$ is stored in the cell 15 and at the end of the time $T_1$ this number $S_O$ is transferred from the cell 15 to the cell 14 and the number $S_1$ is stored in the cell 15.

These operations have repeated in the same way and the cycle terminates in the following sequence:

$T_{14} \rightarrow x$ reading of $D_7$ in the cell 0 and of $D_{15}$ in the cell 8 of the memory 214;

$x$ computation of $S_{14}$ and $S_{15}$ in the arithmetic unit 212;

$x$ storage of $S_{14}$ in the cell 15 of the memory 215.

$T_{15} \rightarrow x$ transfer of $S_{14}$ to the cell 14 of the memory 215;

$x$ storage of $S_{15}$ in the cell 15 of the memory 215.

It can therefore be seen that, at the end of the time T reserved for application of the term $C \times E_3 \times P$ to the numbers $D_0$ to $D_{15}$ to obtain the numbers $S_0$ to $S_{15}$, the memory 214 still contains nine numbers $D_7$ to $D_{15}$ in the cells 0 to 8 and that the memory 215 contains the sixteen numbers $S_0$ to $S_{15}$, which are the outcome of this application, in the cells 0 to 15. This memory 215 forms part of the following cell in which $C \times E_2 \times P$ is to be applied to the numbers $S_0$ to $S_{15}$ which, for this application, perform the function of the numbers $D_0$ to $D_{15}$. Accordingly, the memory 215 has to perform the same function for the following module during the following time T as the memory 214 for the module described in the cycle hereinbefore described. To this end, at the beginning of the time $T_1$ of the following cycle, the signal H/16 controls the switching of all the commutators, more especially the commutators 218, 221, 222. These commutators thus symbolically represented are of course made with static devices, such as transistors for example. Thus, the memory 215 no longer receives the numbers coming from the arithmetic unit 212 and it receives the clock signal H/2 instead of the clock signal H. On the other hand, the cells 0 and 8 of this memory are read simultaneously and the numbers thus obtained are applied to the arithmetic unit of the module by the commutator 221.

If there were only a single transform to be computed, a modular structure of this kind would be of no interest because it would be sufficient for example to loop the output of the commutator 221 to the inputs of the arithmetic unit 212 while adequately modifying the coefficients $W^i$ contained in that unit for each cycle. When, on the other hand, it is desired to compute a successive series of Fourier transforms, for example for analysing in real time the signals obtained in a physical measuring apparatus, the modular structure becomes interesting because, when one of the modules has completed its application, it becomes available for effecting the same application on the following collection of numbers associated with the following transform.

Thus, at the end of the cycle described above, the numbers $S_0$ to $S_{14}$ of a first Fourier transform of sixteen samples of a signal which are in the process of computation and which emanate from application of the term $C \times E_3 \times P$ undergo application of the term $C \times E_2 \times P$ in the following module and the module which has thus delivered these numbers $S_0$ to $S_{14}$ will be free to re-effect the application of $C \times E_3 \times P$ to a new series of numbers $D_0$ to $D_{15}$ of a second Fourier transform of the sixteen samples of the analyzed signal.

During the cycle which has been described, these numbers emanating from the arithmetic unit 211 of the preceding module were stored in the memory 213 via the commutator 217. Since all the commutators were switched at the end of this cycle, the arithmetic unit 212 receives the numbers $D_i$ coming from the memory 213 via the commutator 220 and stores the numbers $S_1$ emanating from this new application in the memory 216 of the following module via the commutator 218. Similarly, the memory 214 used for the preceding application is now filled with the numbers $D_i$ of a third transform coming from the arithmetic unit 211 via the commutator 217. This memory was not completely empty, although this is unimportant because the storage process comprises an erasure phase for the preceding entries.

As has just been shown, the memories of one module are successively filled with the numbers coming from the preceding module and are then emptied to feed the arithmetic unit of the module of which they are part, this alternation taking place at the succession frequency of the transforms. The role of the various commutators is to allow this exchange between the role of the memories both at the level of the transfer of data and at the level of the clock signals.

Figure 3:
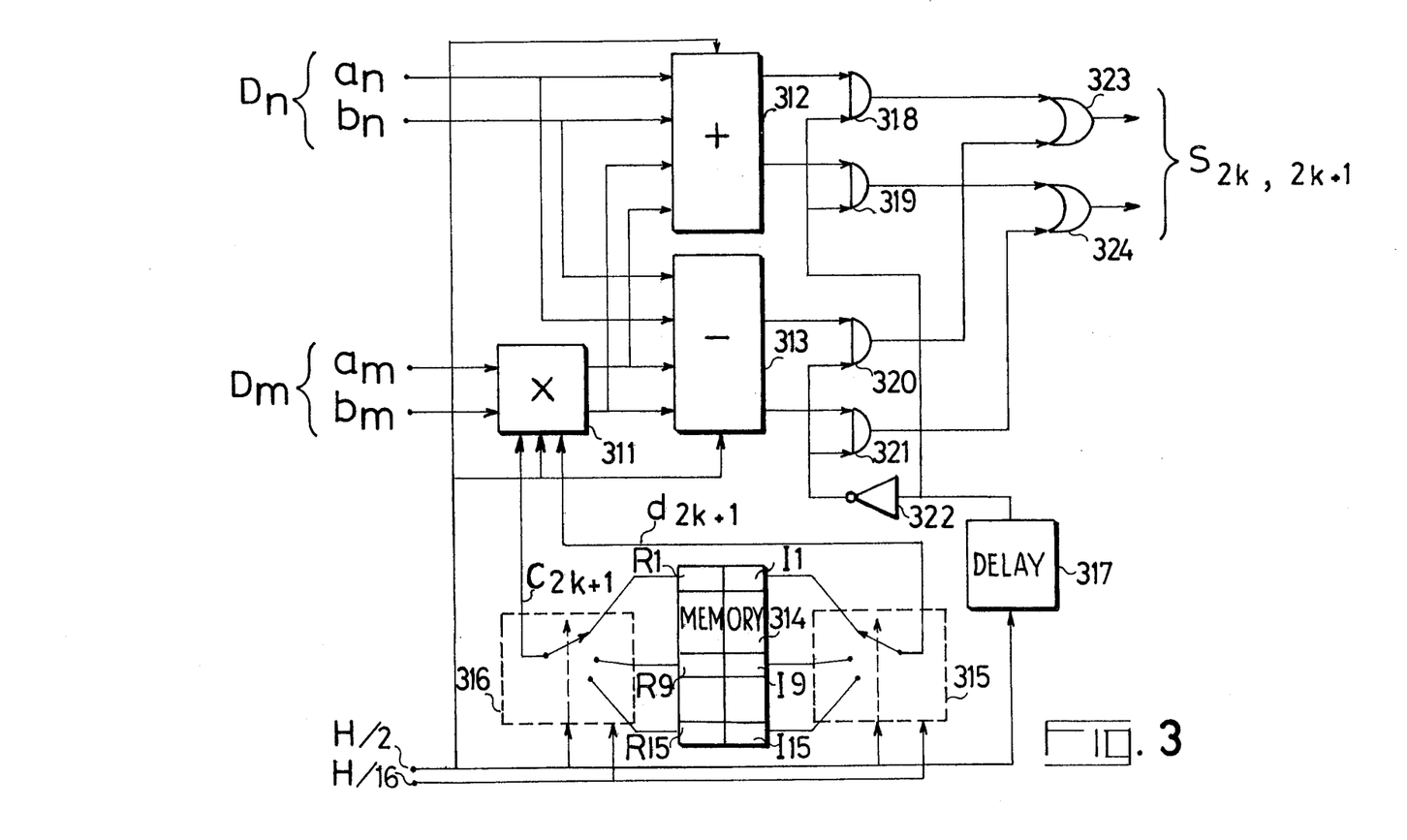
FIG. 3 illustrates a block diagram of the arithmetic unit of this module.

FIG. 3 shows one embodiment of an arithmetic unit such as the unit 212. This unit comprises a multiplier 311, an adder 312, a subtractor 313, a memory 314, two commutators 315 and 316, a delay circuit 317, four AND gates 318 to 321, an inverter 322 and two OR-gates 323 and 324.

The complex numbers $D_n = a_n + j b_n$ and $D_m = a_m + j b_m$ emanating for example from the memory 214 are each in the form of two binary numbers representing the real and imaginary parts of the complex number.

The number $D_n$ is taken as such because, as has been seen, it is always multiplied by $W^0 = 1$.

The number $D_m$ is multiplied in the multiplier 311 by the number $W_{2k+1}$ corresponding to its order. This multiplier, and also the other computing elements, functions at the frequency of the clock signals H/2 and contains the internal delay circuits required for the completion of the computations in the correct order. The coefficient $W_{2k+1} = C_{2k+1} + j d_{2k+1}$ is taken from the memory 314. This memory is a read only memory which is organised into N/2 (eight in the example described) pairs of binary words, the two words of one pair representing the real and imaginary parts of one of the coefficients $W_{2k+1}$. Three of these words are represented in FIG. 3 by the cells labelled $R_1$-$I_1$, $R_9$-$I_9$ and $R_{15}$-$I_{15}$ in conformity with the order of the coefficients $W_{2k+1}$ in the section $E_4$ of FIG. 1. The content of this memory represents the only difference between the various modules of one and the same Fourier transform computer. It is well known how to produce blank memories of which the content is subsequently fixed by a simple operation, such as burning out a certain number of fuses. Thus, the modules described above may be identically produced and then adapted to their use in the computers obtained by assembling them.

The content of these words is cyclically read by way of the commutators 315 and 316 which advance one step after each operation under the control of the clock signal H/2. These commutators also receive the signal H/16 which permits cycle synchronization to be maintained and the reading of the memory to commence with the words $R_1$-$I_1$ at the beginning of the cycle.

In this way, the complex number $W_{2k+1} \times D_m = (a_m \times C_{2k+1} - b_m \times d_{2k+1}) + j(a_m \times d_{2k+1} + b_m \times C_{2k+1})$, composed of course of two binary words, is thus obtained at the output of the multiplier 311.

The adder 312 and the subtractor 313 enable the operations symbolized by the section C in FIG. 1 to be carried out. Thus, the complex number $D_n + W_{2k+1} \times D_m = (a_n + a_m \times C_{2k+1} - b_m \times d_{2k+1}) + j(b_n + a_m \times d_{2k+1} + b_m \times C_{2k+1})$ is obtained at the output of the adder 312 while the complex number $D_n - W_{2k+1} \times D_m = (a_n - a_m \times C_{2k+1} + b_m \times d_{2k+1}) + j(b_n - a_m \times d_{2k+1} - b_m \times C_{2k+1})$ is obtained at the output of the subtractor 313.

These numbers are simultaneously available at the output registers of the components 312 and 313 and are memorized in these registers. In order to put them back in order for successively feeding the memory where they are stored at the frequency of the clock signal H, the gates 318 and 319 are initially opened by the signal H/2 suitably delayed in the delay circuit 317 to compensate the computation delays. This signal is a square signal at the frequency H/2, of which the positive part corresponding to a 1 logic opens the gates 318 and 319 for the duration of an elemental time $T_i$. This signal is inverted in the inverter 322 and its zero part, corresponding to a 0 logic, thus opens the gates 320 and 321 for the duration of the following elemental time.

The OR gates 323 and 324 complete these multiplexing means and collect the succession of the two complex numbers thus re-serialized as a function of time in order thus to deliver the numbers $S_{2k}$, $S_{2k+1}$.

Figure 4:
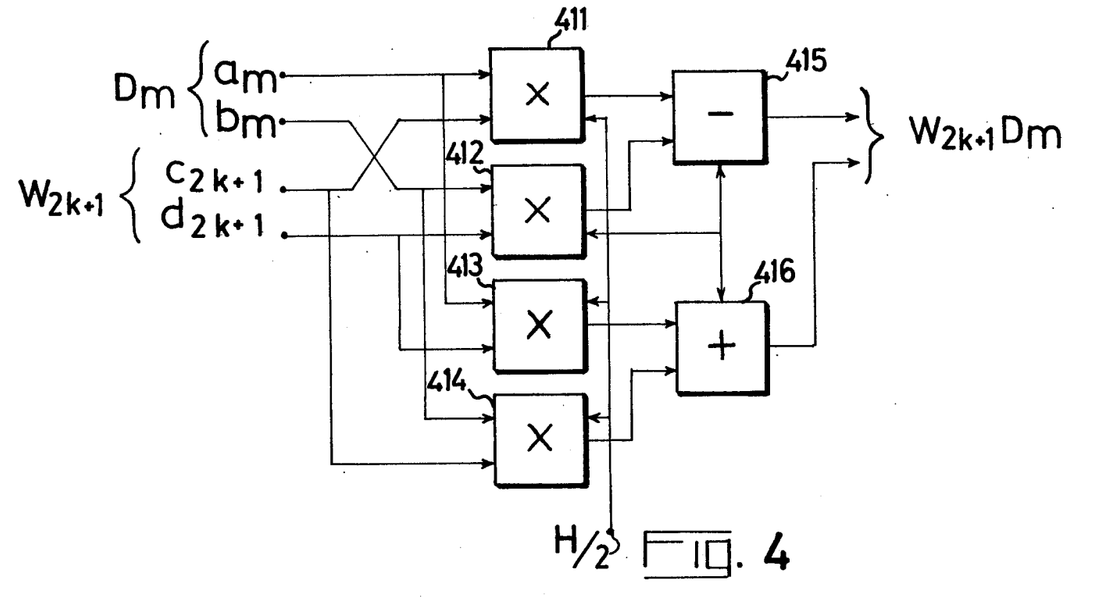
FIG. 4 illustrates a block diagram of a complex multiplier used in this arithmetic unit.

FIG. 4 shows one embodiment of a complex multiplier such as the multiplier 311. This complex multiplier comprises four binary multipliers 411 to 414, a subtractor 415 and an adder 416.

The binary multipliers 411 to 414 enable the binary words $a_m \times C_{2k+1}$, $b_m \times d_{2k+1}$, $a_m \times d_{2k+1}$ and $b_m \times C_{2k+1}$ to be obtained from the binary words representing the real and imaginary parts of the complex numbers. These multipliers, together with the subtractor 415 and the adder 416, operate at the frequency of the clock signals H/2 and contain the internal delay circuits required for completion of the computations in the proper order. In particular, these circuits ensure that the components 415 and 416 only come into operation when the multipliers 411 to 414 have completed their computations.

The subtractor 415 enables the real term $a_m \times C_{2k+1} - b_m \times d_{2k+1}$ of the product $W_{2k+1} \times D_m$ to be obtained while the adder 416 enables the imaginary term $a_m \times d_{2k+1} + b_m \times C_{2k+1}$ of this same product to be obtained.

Accordingly, the complex product of the two complex numbers presented to the inputs of this device is obtained at its output.

By associating $n$ modules each capable of handling N numbers D, it is thus possible to compute $N = 2^n$ Fourier coefficients of the function $f(t)$ represented by N samples taken regularly over a time interval T. The result of this computation will be available with a delay substantially equal to $n$ T which corresponds to the succession of the computations in the sequence of the $n$ modules. This delay is the counterpart of the gain in performance in terms of speed obtained in relation to conventional computers which carry out a processing cycle by iteration in one and the same unit; it is generally not troublesome.

However, to obtain the exact result we must consider the computation $\vec{g} = (1/N) [w] \vec{f}$ of the term of $(1/N)$ and of the permutation matrix Q because the association of these $n$ modules only enables application of the matrix $[w]'$ to be obtained and only delivers a non-standardized signal.

For the term $(1/N)$, it may be acknowledged that it is a scale coefficient which will be taken into consideration in the exploitation of the results. This is all the more interesting insofar as, if a divider by N were to be introduced somewhere into the computer, it would be necessary to increase the resolution of the assembly as a whole in order to take into account the reduction in precision thus introduced on account of the greater influence of the rounding off errors on the last bit due to the reduction in the number of significant digits.

Permutation matrix Q results in multiplexing in another order the numbers which issue in series from the last module of the computer. Accordingly, it is perfectly possible to say that, since these numbers issue in an order which, although known, is not the natural order of the indices of the Fourier coefficients, they will be used as a function of that order.

However, this utilization is often equivalent to parallelizing these numbers so that they are all available at the same time. This is the case in particular when it is desired to obtain the spectrum of a signal which is a function of time. The samples of this signal are presented in series to the input of the computer which is normal because the signal is sampled during its development as a function of time. On the other hand, however, it is desired simultaneously to exploit the N values of the spectral lines because their respective values are generally most important. It is thus advisable to put these numbers back into the natural order of the indices during the actual course of this parallelization.

Figure 5:
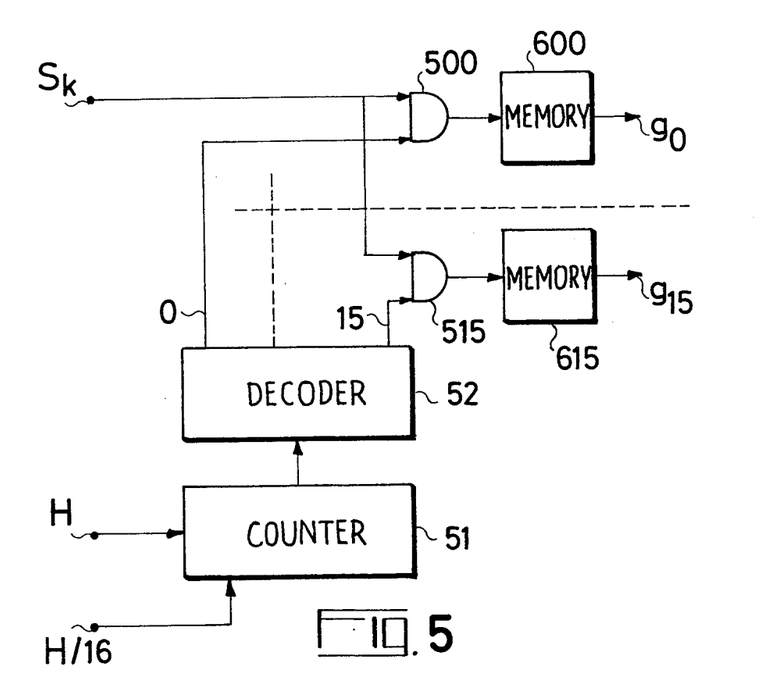
FIG. 5 illustrates a block diagram of a parallelizer for the numbers obtained in the computer.

FIG. 5 diagrammatically illustrates part of an arrangement enabling these two operations to be carried out simultaneously for $N = 16$. This arrangement comprises a counter 51, a decoder 52, 16 gates 500 to 515 and 16 memories 600 to 615.

The counter 51 is a counter by 16 which cycles at the frequency of the clock signal H. The clock signal H/16 enables the phase of the counter to be monitored, making it start from 0 state in synchronism with a cycle T in the modules of the computer. Internal delays in this counter enable the delays due to the computations in the modules to be compensated.

The decoder 52 decodes the states of the counter 15 in the order defined by the matrix Q. This decoding is easy because it is sufficient to take a normal binary decoder and to reverse the order in which its inputs are connected to the outputs of the counter 51 which follows the formation rules of the matrix Q. This decoder thus transmits opening signals to the 16 connections 0 to 15 in the required permutation order.

These connections are connected to the sixteen AND gates 500 to 515 which receive in parallel the same signal $S_k$ issuing from the last module of a Fourier transform computer according to the invention. These gates are thus each opened in turn in the required order and then allow through the signals $S_k$ which are subsequently memorized in the memories 600 to 615. At the end of the sequence, therefore, signals $g_0$ to $g_{15}$ are available together and in the proper order at the outputs of these memories.

Figure 6:
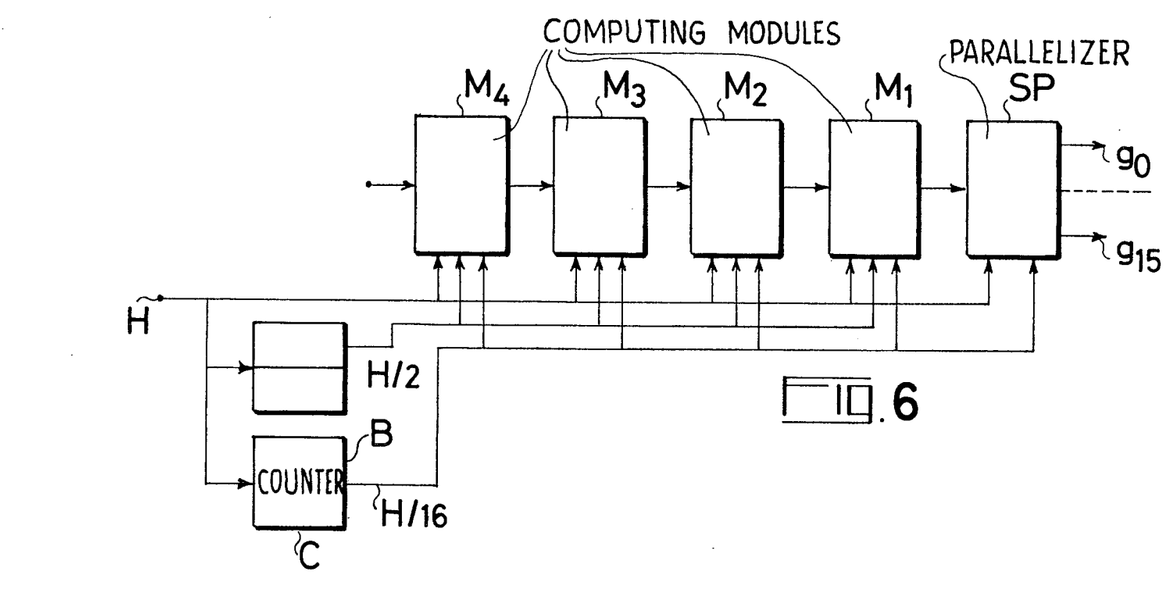
FIG. 6 illustrates a block diagram of a complete computer.

FIG. 6 shows (still in the case where $N = 16$) a Fourier computer according to the invention comprising four modules $M_4$ to $M_1$, a parallelizer SP, a bistable circuit B and a counter C.

This computer receives in series the digitalized samples $f_s$ of an analytical signal of which it is desired to obtain the Fourier coefficients up to the order 16. It also receives synchronous clock signal H, i.e., synchronous with the sampling frequency of the input signal.

The samples $f_s$ are processed in the four modules $M_4$ to $M_1$ connected in series, of which the last module $M_1$ delivers in series the values of the sixteen desired Fourier coefficients. The parallelizer SP, which is an apparatus similar to that shown in FIG. 5, parallelizes these sixteen coefficients by rearranging them in the natural order of the indices and delivers these sixteen coefficients $g_0$ to $g_{15}$ at its outputs.

The bistable circuit B enables the signal H/2 to be obtained from the signal H and the counter by 16, C, delivers the signal H/16 from this same signal H. The analysis period of the computer is fixed by the instant when the counter C passes through the 0 state. It is thus positioned indifferently relative to the input signal which is unimportant because the input signal is permanently sampled and there is no privileged instant in the succession of samples $f_r$. The signals H, H/2 and H/16 enable the operation of the computer as a whole to by synchronized.

This computer may be used for example for computing the spectrum of a signal which is a function of time.

The following documents have been quoted during the French prosecution:

US journal "IEEE Transactions on Audio and Electroacoustics", Vol. AU-18 no2, June 1970, article "FFT organization for High-Speed Digital Filtering" (Whelchel and Guinn);

French Patent FR No. 2 082 030 (Thomson-CSF)

US journal "IEEE Transactions on Audio and Electroacoustics", Vol AU-20 No 3, August 1972, article "A serial minded FFT" (Veenkant).

What we claim is:

1. An apparatus for performing upon an incoming digital signal comprising a succession of $N = 2^n$ elementary incoming digital signals and represented by a vector $\vec{f_p}$ a discrete Fourier transform represented by a matrix [W], delivering an output digital signal comprising N elementary output signals and represented by a vector $\vec{g_j} = (1/N) [W]\vec{f_p}$ said matrix being able to be decomposed in accordance with the equation $$[W] = Q \left[ \prod_{m=1}^{n} (C \times E_m \times P) \right],$$

said apparatus comprising a succession of $n$ modules connected in series, each of said modules corresponding to the calculation of one term $C \times E_m \times P$, the first of said modules receiving said incoming digital signal, the last of said modules delivering a non-standardized succession of N output digital signals represented by a vector $$\left[ \prod_{m=1}^{n} (C \times E_m \times P) \right] \vec{f_j}, \text{ and}$$

each of said modules comprising:
  memory means for receiving from the preceding module N intermediate digital signals in succession in accordance with a first order, and further delivering pairs of said intermediate digital signals in succession in accordance with a second order defined by the matrix P; and
  calculating means connected to said memory means for receiving said pairs of intermediate digital signals, performing upon said pairs of intermediate digital signals the calculations corresponding to the matrix product $C \times E_m$, and delivering to the next module successively N next intermediate digital signals.

2. An apparatus as claimed in claim 1 further comprising:
  a plurality of digital gates for simultaneously receiving the succession of said output digital signals;
  means for opening at said first rhythm successively said gates in a natural order; each of said gates delivering one of said output digital signals; and
  a plurality of memories connected respectively to said digital gates for simultaneously and permanently delivering said output digital signals onto a plurality of output connections.

3. An apparatus as claimed in claim 1, wherein said memory means comprise two identical memories and commutation means for interchanging said two identical memories when said calculations corresponding to the matrix product $C \times E_m$ are performed; one of said memories being connected to said preceding module via said commutation means while the other one of said memories is connected to said calculation means via said commutation means.

4. An apparatus as claimed in claim 3 wherein said identical memories comprise respectively N words numbered from 0 to N−1, and said memory means further comprise:
  means for loading with said intermediate digital signals said one memory in a series from said word N−1 at a rhythm marking the arrival of said intermediate digital signals from said preceding module;
  means for shifting the content of each of said words of said other one memory in the next low numbered word, at a second rhythm half of said first rhythm; and
  means for simultaneously reading the content of the words 0 and N/2 of said other one memory, delivering said pairs of intermediate digital signals to said calculating means.

5. An apparatus as claimed in claim 4, wherein said calculating means comprise:
  a third memory for memorizing a set of coefficients forming the matrix $E_m$;
  means for successively reading into said third memory said coefficients at said second rhythm;
  means for receiving one signal of one of said pairs of intermediate digital signals and one coefficient read into said third memory, multiplying said one signal with said one coefficient, and delivering a product signal;
  means for receiving the other one signal of said one pair of intermediate digital signals and said product signal, adding said other one signal and said product signal, and delivering a sum signal;
  means for receiving the other one signal of said one pair of intermediate digital signals and said product signal, subtracting said product signal from said other one signal, and delivering a difference signal; and
  means for multiplexing said sum and difference signals, providing said next intermediate digital signals.

6. An apparatus as claimed in claim 5, wherein said third memory is a read only memory.

* * * * *